United States Patent [19]
Baker et al.

[11] Patent Number: 4,965,523
[45] Date of Patent: Oct. 23, 1990

[54] GLASS CONTAINER INSPECTION MACHINE WITH REJECTION PARAMETER SELECTOR

[75] Inventors: Russ J. Baker, Horseheads; Robert A. Hansen, Elmira, both of N.Y.; Paul F. Scott, Hartford, Conn.; Edward F. Vozenilek, Clarks Summit, Pa.

[73] Assignee: Emhart Industries, Inc., Towson, Md.

[21] Appl. No.: 414,919

[22] Filed: Sep. 29, 1989

Related U.S. Application Data

[60] Continuation-in-part of Ser. No. 343,712, Jun. 12, 1989, Division of Ser. No. 253,832, Oct. 5, 1988, Pat. No. 4,862,062.

[51] Int. Cl.$^5$ ............................................. G01R 27/26
[52] U.S. Cl. .................................. 324/672; 209/523; 324/671
[58] Field of Search .................. 324/61 R, 61 P, 671, 324/672; 209/82, 523; 73/1 J

[56] References Cited

U.S. PATENT DOCUMENTS

| | | | |
|---|---|---|---|
| 2,573,824 | 11/1951 | Baker | 324/61 R |
| 2,616,068 | 10/1952 | McDonald | 324/61 R |
| 3,684,089 | 8/1972 | McMeekin | 324/61 R |
| 4,820,972 | 4/1989 | Scott et al. | 324/61 R |

Primary Examiner—Reinhard J. Eisenzopf
Assistant Examiner—Maura K. Regan
Attorney, Agent, or Firm—Spencer T. Smith

[57] ABSTRACT

A device for inspecting a glass container to evaluate its wall thickness. The minimum thickness, the maximum thickness and the minimum to maximum thickness ratio are calculated and an inspected bottle is rejected based on one or more of these three parameters.

5 Claims, 6 Drawing Sheets

| OPERATION SETUP | REJECTION SETPOINTS | CAVITY NUMBERS | ALARMS |
|---|---|---|---|
| CHANNEL | MINIMUM | MAXIMUM | RATIO |
| 1 | .030 | .060 | 0.75 |
| 2 | .030 | .060 | .075 |
| 3 | .030 | .060 | .075 |
| 4 | .030 | .060 | .075 |

0 = OFF

ENTER NEW VALUE
LINE #1  10:57   19-APR-89

GLASS CONTAINER INSPECTION MACHINE WITH REJECTION PARAMETER SELECTOR

This application is a continuation-in-part of U.S. patent application Serial No. 07/343,712 filed June 12, 1989, which itself is a divisional application of application Ser. No. 253,832 filed Oct. 5, 1988 and now issued as U.S. Pat. No. 4,862,062.

A bottle is formed from a gob of molten glass in an individual section glass container forming machine by first pressing or blowing the gob in a blank mold into a parison and then blowing the formed parison into a container in a finish mold. When glass is uniformly distributed during the formation of the container, wall thickness will be uniform, but when glass distribution is not uniform, thin spots can occur and these thin spots may result in bottle failure during filling or handling.

Historically, thin spots were identified by slicing a formed bottle and performing measurements along the cut wall to find locations which were unacceptably thin relative to the rest of the wall. When thin spots were found, the forming process was evaluated to find out why the glass was not being uniformly distributed.

Technology has been developed which makes use of the high dielectric constant of glass by measuring the capacitance of the glass wall between two elongated electrodes which contact the bottle as it is rolled along the sensor. The head of the sensor communicates with an oscillator which generates a voltage which is representative of the thickness of the wall. This voltage is continuously generated as the bottle rolls along the elongated sensor and if this voltage decreases below a selected value (the value representative of the minimal acceptable bottle thickness), the bottle is rejected for having a thin spot.

It is an object of the present invention to provide a bottle inspection apparatus which not only will reject a bottle when an unacceptable thin spot is identified, but will also reject the bottle whenever there is an unacceptable non-uniform distribution of glass in the formed bottle.

It is another object of the invention to provide a bottle inspection apparatus that permits the selection of either minimum wall thickness, maximum wall thickness or the ratio of the minimum to maximum wall thickness as the basis for rejection of containers.

Other objects and advantages of the present invention will become apparent from the following portion of the specification and from the following drawings which illustrate in accordance with the mandate of the patent statutes a presently preferred embodiment incorporating the principles of the invention.

Referring to the drawings:

FIG. 6 shows a display employed in the embodiment of FIG. 5.

Figure 1:
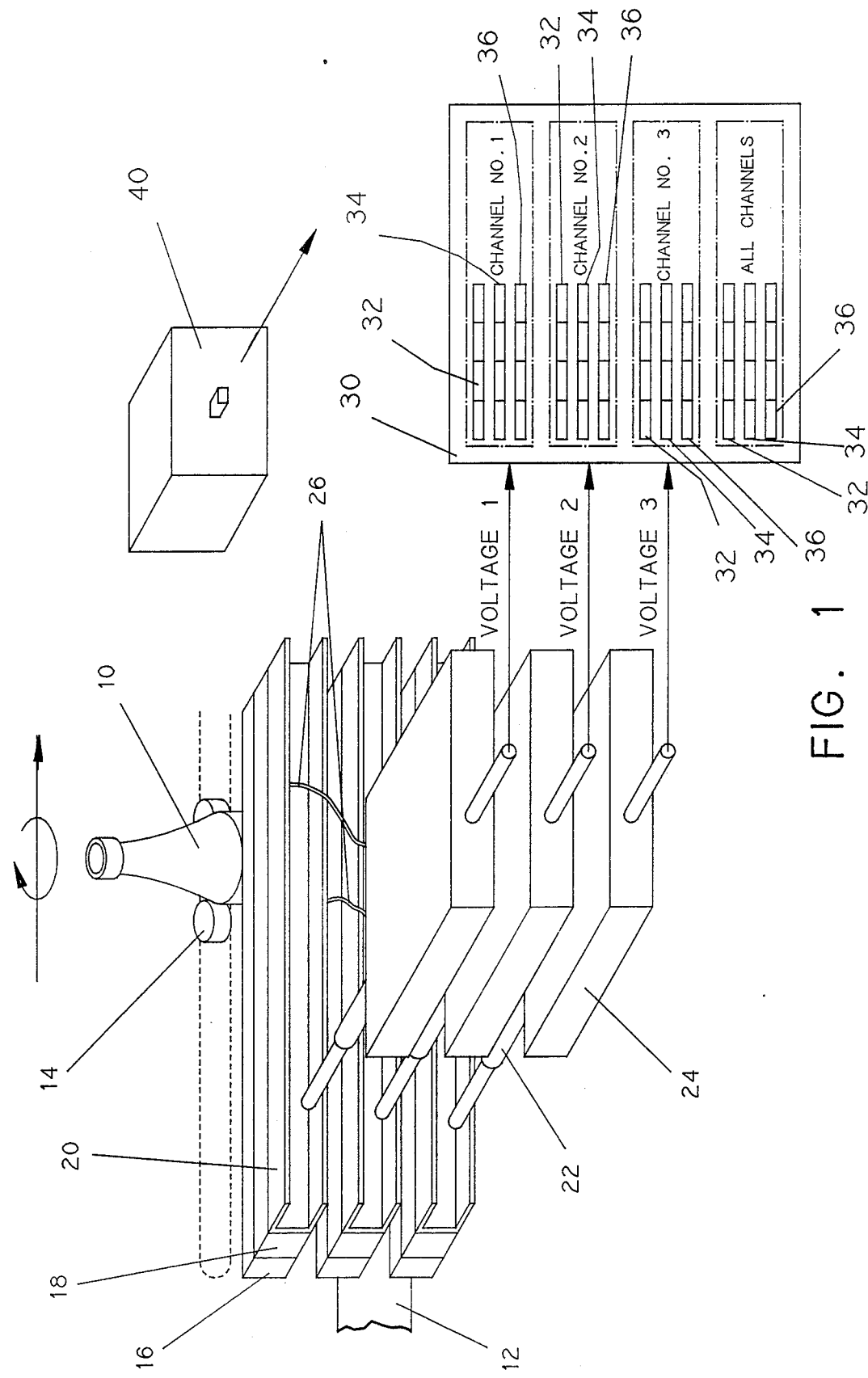
FIG. 1 is an oblique view of the inspection station of a glass container inspection machine.

The glass container inspection machine has a station for testing a formed container or bottle 10 which is supported by a support plate 12 and which is advanced along the support plate 12 by a bottle carrier 14. During its displacement past the test station, the carrier 14 forces the bottle against a number (three as illustrated in FIG. 1 for purposes of clarity, but four are normally used) of parallel horizontally extending, vertically spaced capacitance sensing strips 16 which are secured to resilient foam strips 18 mounted on suitable brackets 20. The brackets are connected by posts 22 to corresponding head oscillator assembly housings 24. Each oscillator receives a capacitance signal from its associated capacitance sensing strip via a calibrated cable 26 and generates a continuous voltage signal which is supplied to a computer 30.

The machine operator defines minimum wall thickness 32, maximum wall thickness 34, and minimum/maximum wall thickness ratio 36 set points for each sensor by entering this data into the computer (for purposes of illustration these inputs are schematically shown as settable thumb wheel switches).

Figure 2:
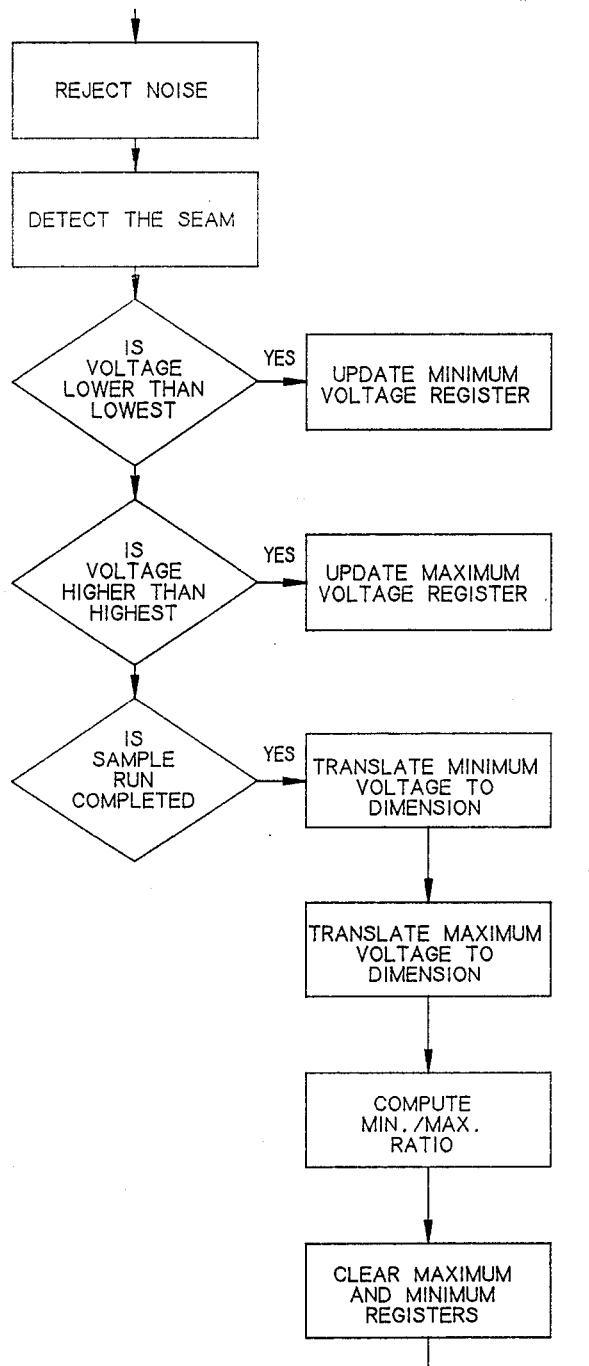
FIG. 2 is a logic diagram illustrating the operation of the machine's controller to determine whether an inspected container should be rejected and providing for the selection of the parameter or parameters upon which rejection is to be based.
Figure 2:
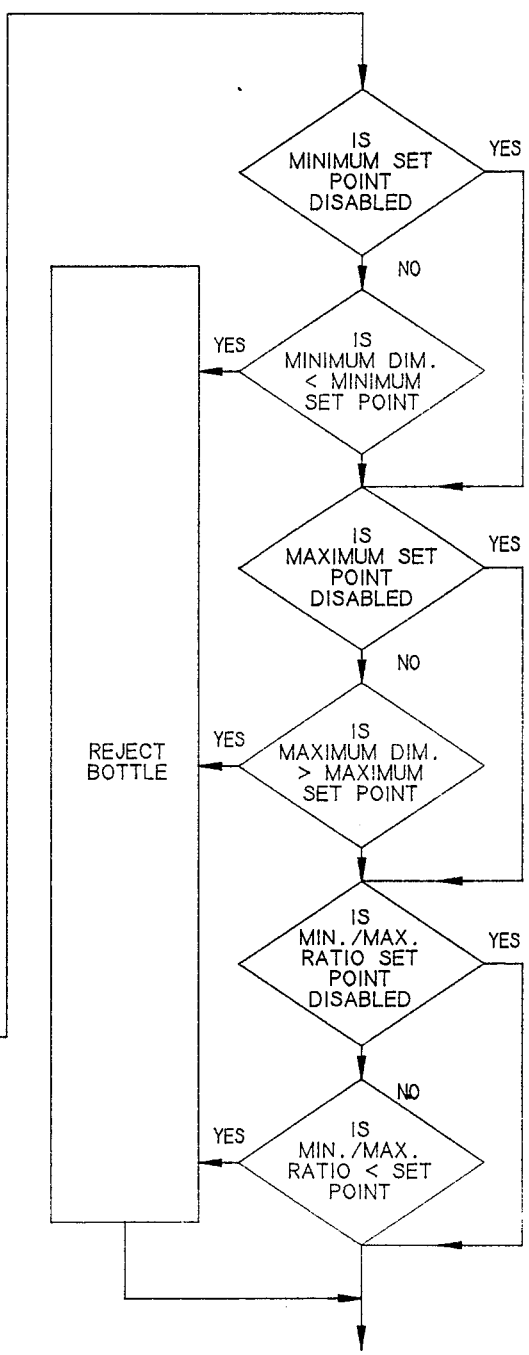

As can be seen from the flow diagram illustrated in FIG. 2, the voltage signal generated by each oscillator is processed to Reject Noise (by averaging, for example). The Detect The Seam circuit determines that data in the vicinity of a seam is being generated and ignores this data which would produce a false thin spot reading. Two to three hundred readings or data samples are taken around the bottle at each sensor and then evaluated to identify the lowest and highest voltage around the bottle. These voltages are stored in suitable registers which are updated whenever a lower or higher voltage is sensed until readings have been taken completely around the bottle. A highest voltage and lowest voltage register can be provided for each sensor (channel) and a highest and lowest register can be provided for the data of all the sensors (channels). At this time, the voltage which represents the thinnest spot around the tested periphery (either for one or for all channels) and the voltage which represents the thickest spot around the tested periphery (either for one or for all channels) are converted using a calibrated function equation to dimensions (millimeter for example) and the registers are cleared for the next bottle. The minimum dimension, the maximum dimension, or the ratio of the minimum to maximum dimensions may be used as a basis for rejecting a bottle. The parameter or parameters upon which rejection of a bottle is to be based are selected by selecting a non-zero rejection setpoint. If a zero setpoint is selected, i.e., if the set point is disabled, then the software skips over the parameter as a basis for rejection. Depending on which parameters are provided with a non-zero setpoint (i.e., enabled), if the minimum dimension is less than the minimum setpoint, or if the maximum dimension is higher than the maximum setpoint or if the minimum to maximum ratio for these two dimensions is less than the minimum to maximum setpoint, the bottle will be rejected by a suitable reject mechanism 40.

Figure 3:
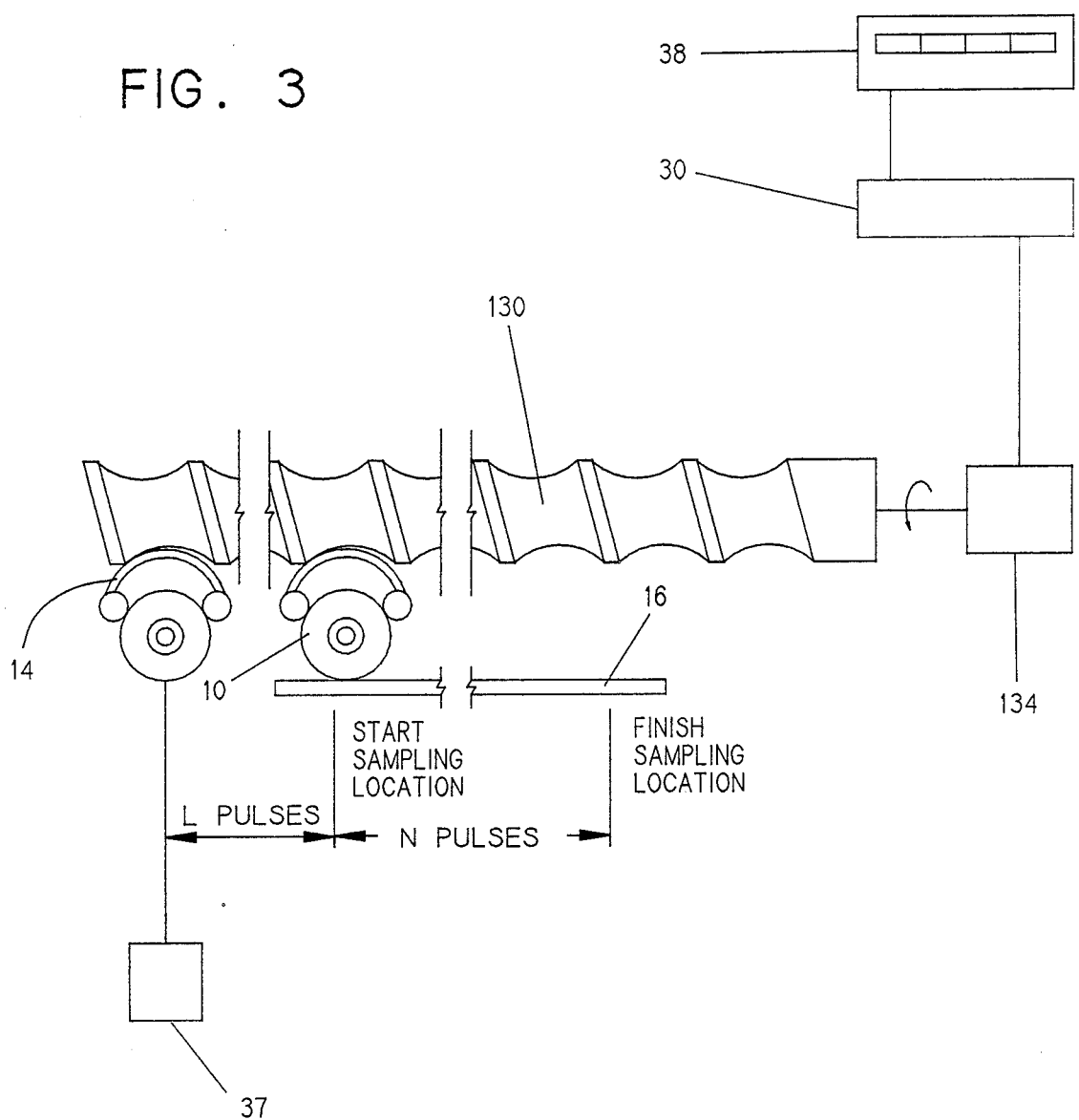
FIG. 3 is a schematic illustration of the mechanism for advancing the bottles through the test station.

FIG. 3 schematically illustrates the system for advancing the bottles to and through the test station. This system includes an elongated cam 130 which rotates at a speed proportional to the speed of the bottles through the test station. The cam engages a carrier 14 at a start position which is sensed by a suitable sensor 37. The rotational position of the cam is monitored by an encoder 134 and the encoder reading when the carrier is at this start position is defined as the start pulse by the computer 30. As the cam continues to advance the carrier 14, a captured bottle 10 will be translated towards the right until the bottle engages the capacitance strip 16 and reaches a desired start sampling location defined by a selected encoder count (L). The sampling will then take place with a data sample evaluated by the computer 30 at each subsequent count until the count reaches a selected number (N) which assures that the entire periphery of the bottle has been sampled (the Finish Sampling Location). For smaller bottles, a portion of this peripheral ring will be analyzed twice. The operator inputs the sensor (16) size via a hand held terminal or the like 38 and the computer sets the correct N number for the maximum size bottle that can be tested on that sensor.

Figure 4:
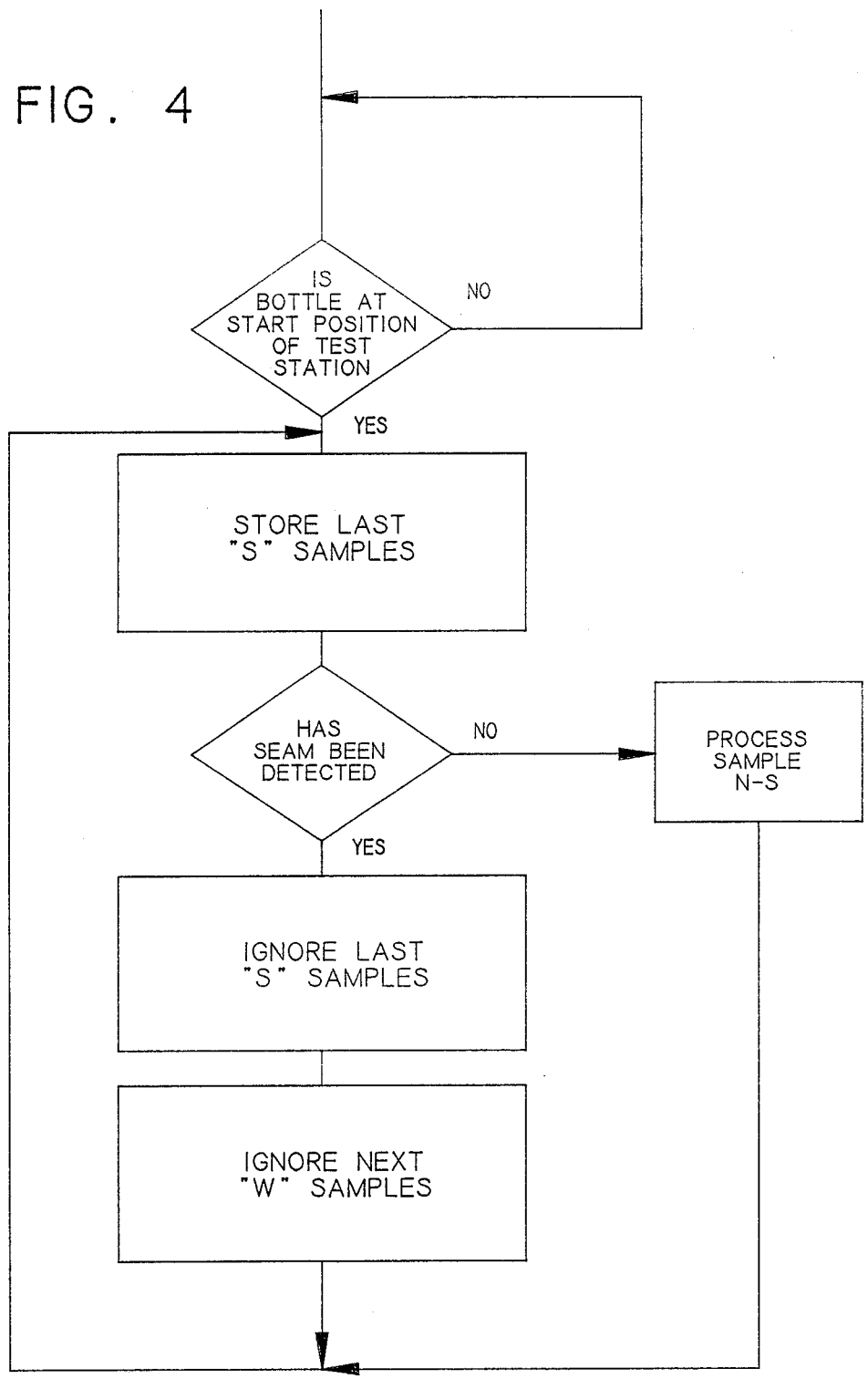
FIG. 4 is a flow chart illustrating the algorithm for defining the window during which data sampled proximate a seam will be ignored.

As can be seen from FIG. 4, the last "S" (four, for example) data samples are stored in a Store Case "S" Sample and each time a new data sample is placed in storage, the oldest data sample is processed by the Process Sample - S. A data sample will accordingly be evaluated at each pulse until the bottle wall seam has been detected by a conventional seam detector 30. At this time, all the sample data in the Store Case "S" samples will be ignored as will future data samples for a "W" pulse count. "S" and "W" are settable to cover a selected window during which seam data would normally be evaluated. Following the counting of "W" pulses, the sample data will again be evaluated each pulse until the Finish Sampling Location is reached.

Figure 5:
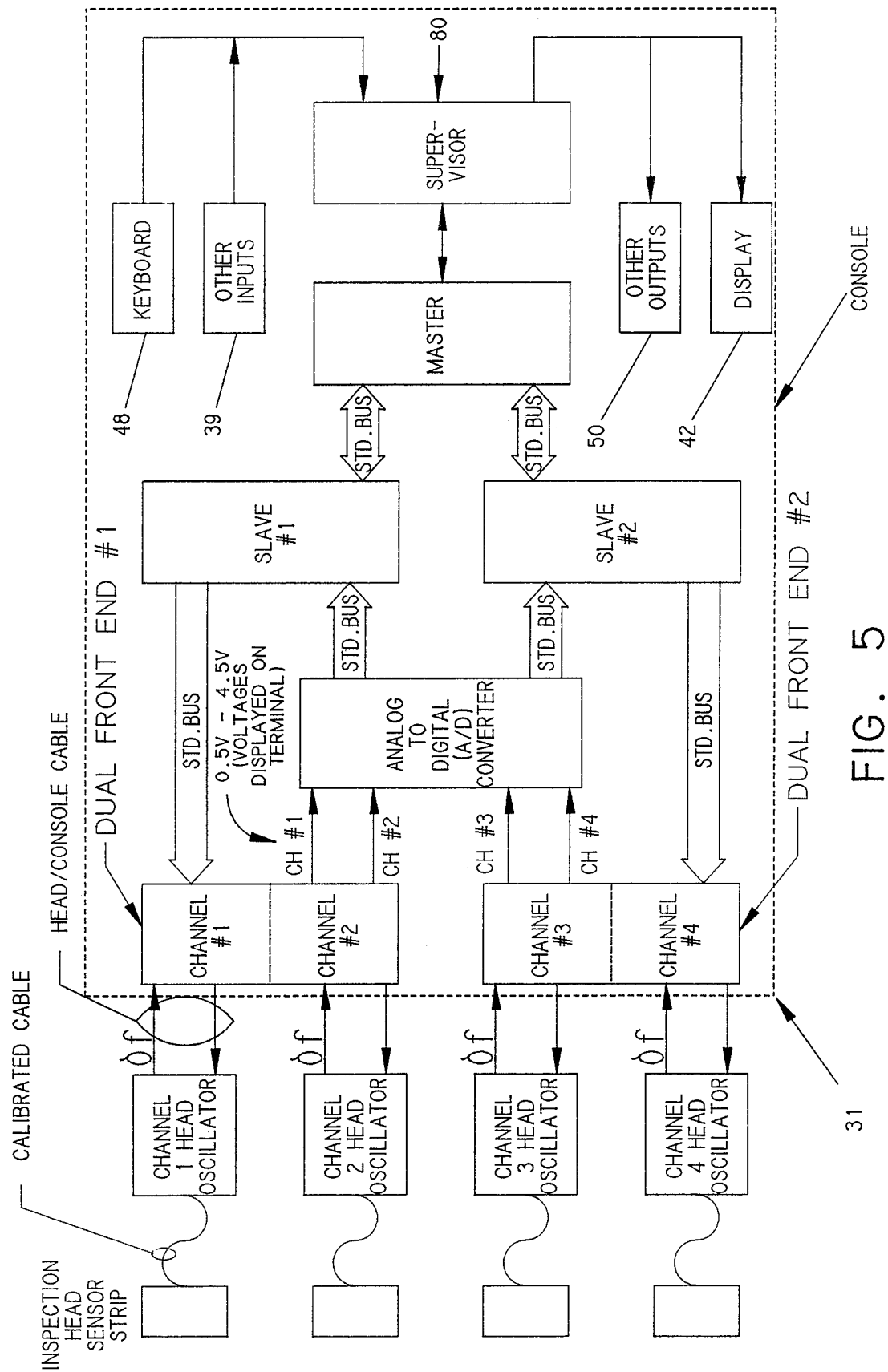
FIG. 5 is a schematic diagram of an alternative preferred embodiment of a glass container inspection machine according to the invention.

An alternative embodiment of the invention is shown in FIGS. 5 and 6. In this embodiment, the computer 80 and other electronics referred to as the "front end" electronics are included in a console 31 which also includes a keyboard 48 and a display 42. In this embodiment, the "other inputs" 39 may include settable thumb wheel switches 32, 34 and 36 and the "other outputs" 50 will include a reject mechanism 40. Also in this embodiment, all four of the usual channels are shown. In this embodiment, the parameters upon which the rejection of bottles is to be based and the rejection setpoints may be selected as follows. The keyboard 48 is used to enter the Rejection Setpoints mode in which a screen as shown in FIG. 6 is placed on the display by software in the computer 80. A lighted area appears behind the "Rejection Setpoints" heading to indicate the system is in Rejection Setpoints mode. A lighted cursor is moved via conventional cursor control keys on the keyboard to move the cursor to select one of four rows to select the desired channel and one of three columns to select either the minimum thickness parameter, the maximum thickness parameter, or the min/max ratio parameter. The desired value of the rejection setpoint is then typed into the keyboard and entered, whereupon it is stored in the computer memory and displayed on the screen. For example, on the screen shown, a setpoint of 0.030 inches has been selected for the minimum thickness parameter for each of the channels. Entering a zero value for any channel-parameter position turns off the rejection function for that channel for that parameter. Referring to FIG. 2, it is seen that if zero is selected as the setpoint, the software skips that parameter making a rejection decision for the specified channel.

The ability to select one or more of various parameters to base the rejection on provides much more flexibility as compared to prior art glass inspecting machines in which only a minimum voltage below which bottles are to be rejected can be set. The plurality of selectable and settable parameters also results in much higher accuracy of rejection. Since generally a gob of molten glass from which the bottle originated is of a definite weight, if a part of the bottle has too much glass, another part will likely not have enough glass. Thus the ability to chose maximum thickness as a parameter enables one to in effect reject based on the fact that parts of the bottle which are not scanned by the sensing heads are likely too thin. Depending on the particular bottle being inspected and other factors, one or the other of the parameters that are selectable may not provide an accurate rejection basis. The invention provides the option of selecting only those parameters for a particular run that will provide the most effective rejection basis.

What is claimed is:

1. An apparatus for measuring the wall thickness of a glass container, said apparatus comprising;
   sensing means for producing a signal representative of the thickness of a wall of a glass container presented to it;
   means for presenting a glass container to said sensing means so that its wall thickness may be sensed; and
   first means responsive to said sensing means for providing a minimum thickness signal representative of the minimum wall thickness of said container;
   second means responsive to said sensing means for providing a maximum thickness signal representative of the maximum wall thickness of said container;
   selecting means for selecting one or more parameters from the group consisting of maximum wall thickness and minimum wall thickness;
   rejecting means responsive to said minimum thickness signal, said maximum thickness signal, and said selecting means for rejecting a glass container based on said one or more selected parameters.

2. An apparatus as in claim 1 wherein said selecting means comprises a display means, a computer means for displaying said parameters on said display and input means communicating with said computer for selectively indicating one of said parameters displayed on said display.

3. An apparatus as in claim 2 wherein said input means further comprises means for assigning a selected value to the one of said parameters that is indicated by said indicating means on said display.

4. An apparatus as in claim 3 wherein said selecting means further comprises means for rejecting a glass container based on a specific one of said parameters only if the selected value assigned to said specific parameter is non-zero.

5. An apparatus for measuring the wall thickness of a glass container, said apparatus comprising;
   sensing means for producing a signal representative of the thickness of a wall of a glass container presented to it;
   means for presenting a glass container to said sensing means so that its wall thickness may be sensed; and
   first means responsive to said sensing means for providing a first thickness signal representative of the minimum wall thickness of said container;

second means responsive to said sensing means for providing a second thickness signal representative of the maximum wall thickness of said container;

means for calculating the ratio of minimum to maximum wall thickness, selecting means for selecting one or more parameters from the group consisting of said minimum wall thickness, said second thickness and said ratio;

rejecting means responsive to said first thickness signal, said second thickness signal, and said selecting means for rejecting a glass container based on said one or more selected parameters.

* * * * *